United States Patent Office 3,034,211
Patented May 15, 1962

3,034,211
METHOD OF MAKING CLAD STEEL
Edward J. Roehl and Emory B. Michel, Warren, and John Kalla, Youngstown, Ohio, assignors to Pittsburgh Steel Company, Pittsburgh, Pa., a corporation of Pennsylvania
No Drawing. Filed Dec. 29, 1959, Ser. No. 862,463
2 Claims. (Cl. 29—492)

This invention relates generally to methods of making clad steel, but has reference more particularly to a method of making stainless clad steel continuously.

It has heretofore been proposed, in the prior art, to make stainless clad steel by a method in which a strip of stainless steel, is plated with iron, and is disposed in contact with a strip of carbon steel, with the iron plating contiguous to the carbon steel strip, the strips are edge welded to each other and run through a heating furnace, in which the strips are heated to a temperature which will permit the strips to become welded together upon subsequent application of pressure to the strips, and then applying such pressure to the heated strips.

Attempts by those skilled in this art to produce satisfactory stainless clad steel by following the rather vague and general teachings of such prior art have resulted in failure.

As the result of considerable experimentation, involving control of a number of critical factors, we have developed a method of producing continuously stainless clad steel, which is highly satisfactory for all purposes, and is of uniform quality throughout.

In accordance with the invention, a strip of low carbon steel and a strip of stainless steel, which is to form the cladding metal, are fed from coils continuously in the same direction, and in superimposed relationship with each other.

The side of the stainless steel cladding strip which is adjacent the low carbon steel base strip is then plated with a thin plating of nickel. It has been found that nickel provides a coating which can easily be pressure welded to the base strip during a subsequent pressure welding step in this method, whereas iron has not proved satisfactory for this purpose.

The thickness of the nickel plating or coating is a critical factor in the method, and it has been found that the thickness of the nickel plating should be in excess of .0001 inch, preferably about .0002 inch. Thicknesses of less than .0001 inch will not produce a good bond, and while thicknesses in excess of .0002 inch are satisfactory, they are not economical, although thicknesses up to about .001 inch may be used, as a practical limit. Plating metals other than nickel are not as satisfactory as nickel, for the purposes of this invention.

Following the plating step, the stainless steel cladding strip is moved into engagement with one side of the low carbon steel base strip, and if desired or necessary, the strips may be run through a roller leveler or other flattening device, in order to flatten the strips so that they will lie flat against each other.

The strips are then passed through a furnace, in which the strips are heated to a temperature which will permit them to be welded together when pressure is subsequently applied to them. The furnace in which the strips are heated should preferably be supplied with edge rollers or similar devices for maintaining the strips in edge alignment with each other.

The temperature to which the strips are thus heated is a highly important factor or consideration, the range of heating being from about 1650–1850° F., with about 1750° F. as a preferred or optimum temperature. Temperatures below this range are not effective, and temperatures above this range are uneconomical and unnecessary.

Another important factor or consideration is that of maintaining a non-oxidizing atmosphere in the heating furnace, for if such an atmosphere is not maintained, the surfaces of the strips and the nickel plating become oxidized to an extent that a satisfactory bond between the strips is not obtained during the subsequent pressure welding or rolling operation. For this purpose, the air within the heating furnace is replaced by an atmosphere which is non-oxidizing, that is to say, free from oxygen and its compounds. Hydrogen provides an ideal atmosphere for this purpose, but for reasons of economy, the hydrogen is diluted to some extent with nitrogen, the extent of dilution being at least that at which the mixture of hydrogen and nitrogen will burn when escaping into the surrounding air or atmosphere exterior to the furnace. This dilution is also a safety measure or precaution, since if hydrogen alone is used, any such hydrogen which escapes might form an explosive mixture in the air or in the furnace. It has been found, in this connection, that industrial reducing atmosphere containing carbon monoxide and/or carbon dioxide, or water vapor, are not satisfactory for the purposes of the present invention, and cannot be employed in the heating furnace.

After the strips have been heated to the required temperature, they are pressure welded to each other by passing them through a pair or rolls immediately after the strips leave the heating furnace. To avoid oxidation of the strips or plating, after the strips leave the heating furnace, it is desirable that the exit end of the heating furnace be disposed as closely as possible to the pressure welding rolls.

As the heated strips pass between the rolls, the strips become fused or welded to each other throughout their width, so that a clad strip is produced which is wound on a driven tension reel which is effective to pull the strips through the apparatus units to which reference has been made.

Under the temperature conditions which have been specified, I have found that the pressure rolling or pressure welding operation must be carried out at pressures sufficient to accomplish a reduction in thickness of the combined strips of between 30 and 45%, in order to produce a good bond.

It is thus seen that we have provided a method of making stainless clad steel, in which various critical factors have been employed to insure production of a highly satisfactory product.

As a variant or modification of the method, as thus described, the strip of stainless steel may be in the form of a coil which has already been plated with the nickel before entering into the continuous cladding method, thereby dispensing with the necessity of plating the stainless steel strip with nickel during the cladding method.

It will be understood that slight changes may be made in the method, as described, without departing from the spirit of the invention or the scope of the appended claims.

Having thus described our invention, we claim:

1. The method of making clad metal continuously, said method comprising the steps of providing a strip of carbon steel and a strip of stainless steel having a plating of nickel thereon of a thickness of from about .0001 inch to about .0002 inch, moving said strips in the same direction, in superimposed relationship with each other, bringing the strips into contact with each other, with the nickel plating against the carbon steel strip, heating the strips in a non-oxidizing atmosphere and to a pressure welding temperature in the range of from about 1650° F. to about 1850° F., and then rolling the strips under a sufficient rolling pressure to weld the component strips together throughout their length and to reduce the combined thickness of the strips between about 30% and about 45%.

2. The method, as recited in claim 1, in which said non-oxidizing atmosphere consists of hydrogen diluted with nitrogen, and is substantially free from carbon monoxide, carbon dioxide, and water vapor, the extent of dilution being at least that at which the mixture of hydrogen and nitrogen will burn when escaping into the air outside said non-oxidizing atmosphere but will not form an explosive mixture.

References Cited in the file of this patent

UNITED STATES PATENTS

| | | |
|---|---|---|
| 2,225,868 | Huston et al. | Dec. 24, 1940 |
| 2,301,812 | Rentschler et al. | Nov. 10, 1942 |
| 2,414,511 | Dyar | Jan. 21, 1947 |
| 2,539,247 | Hensel | Jan. 23, 1951 |
| 2,782,497 | Campbell | Feb. 26, 1957 |
| 2,809,422 | Schultz | Oct. 15, 1957 |